United States Patent [19]

Hatanaka et al.

[11] Patent Number: 5,500,581
[45] Date of Patent: Mar. 19, 1996

[54] HIGH-EFFICIENCY POWER SUPPLY CONTROL APPARATUS FOR VARIABLE-SPEED INDUCTION MOTOR

[75] Inventors: Takefumi Hatanaka; Naruto Kuwahara, both of Tokyo, Japan

[73] Assignee: Arex Electronics Corporation, Tokyo, Japan

[21] Appl. No.: 206,775

[22] Filed: Mar. 7, 1994

[30] Foreign Application Priority Data

Mar. 8, 1993 [JP] Japan .................... 5-085050

[51] Int. Cl.⁶ .................... H02P 1/24
[52] U.S. Cl. .................... 318/727; 318/772; 318/779; 318/801; 318/803; 318/807; 318/813
[58] Field of Search .................... 318/727, 772, 318/779, 798, 801, 803, 807, 813, 812

[56] References Cited

U.S. PATENT DOCUMENTS

| | | | |
|---|---|---|---|
| 4,327,313 | 4/1982 | Tsuboi et al. | 318/801 |
| 4,511,834 | 4/1985 | Studtmann | 318/801 |
| 4,538,100 | 8/1985 | Tuten et al. | 318/803 |
| 5,010,287 | 4/1991 | Mukai et al. | 318/801 |
| 5,140,248 | 8/1992 | Rowan et al. | 318/801 |
| 5,241,257 | 8/1993 | Nordby et al. | 318/803 |

Primary Examiner—William M. Shoop, Jr.
Assistant Examiner—Karen Masih
Attorney, Agent, or Firm—Jordan and Hamburg

[57] ABSTRACT

An apparatus for controlling the supply of power to a variable-speed induction motor converts an AC power source voltage to a motor supply voltage at a designated frequency, with the amplitude of the motor supply voltage being controlled in accordance with the motor load such that the degree of slip conforms to a predetermined optimum slip charactistic, whereby high efficiency and stability are maintained over a wide range of load values. The motor supply voltage amplitude is detected to provide an indication of the motor load, an optimum value of an operating parameter of the motor which varies in accordance with degree of slip is derived based on the designated frequency and the detected voltage amplitude, using a predetermined function corresponding to that frequency, and the motor supply voltage amplitude is controlled such as to reduce an amount of difference between the optimum value of the operating parameter and a detected value of that parameter.

18 Claims, 14 Drawing Sheets

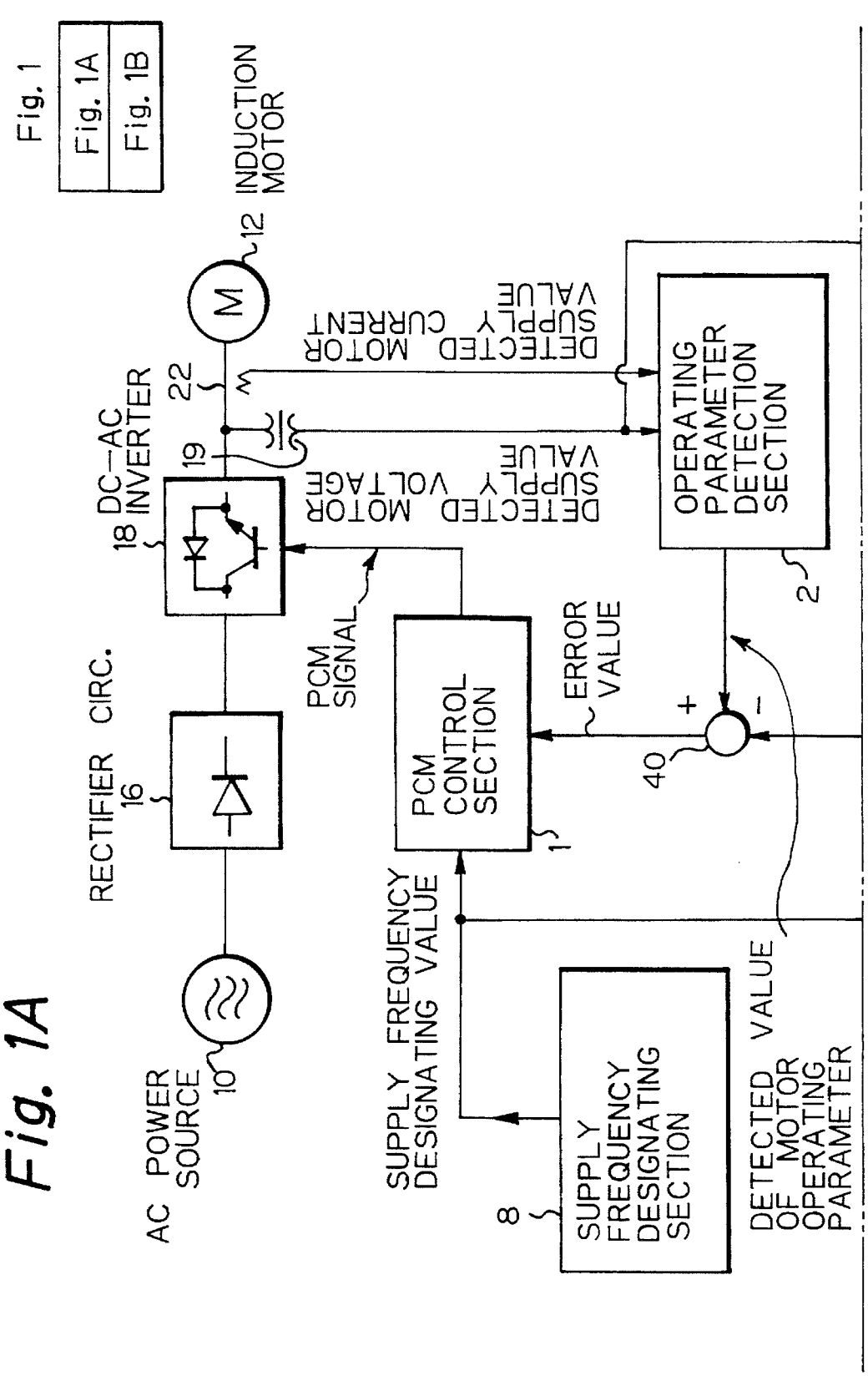

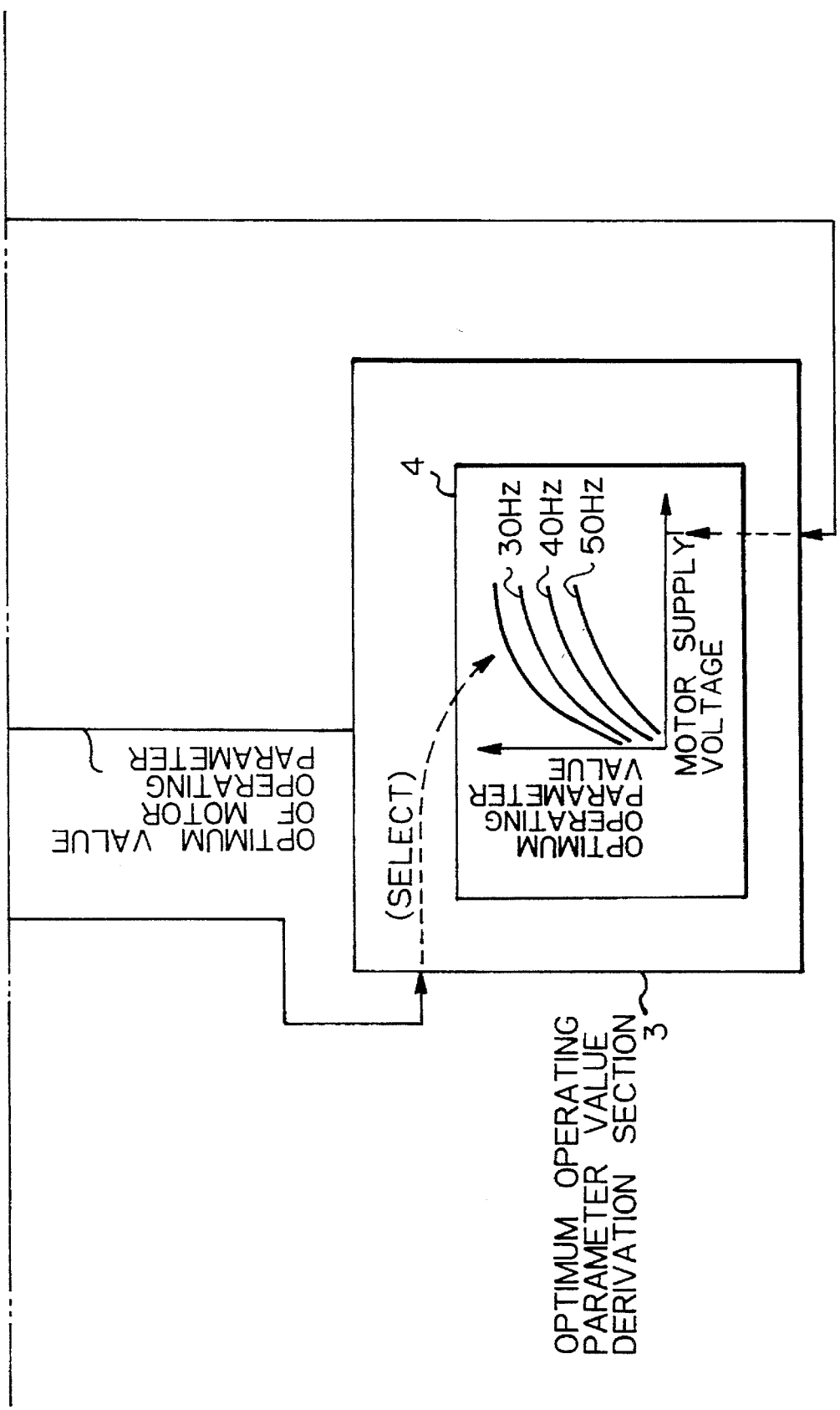

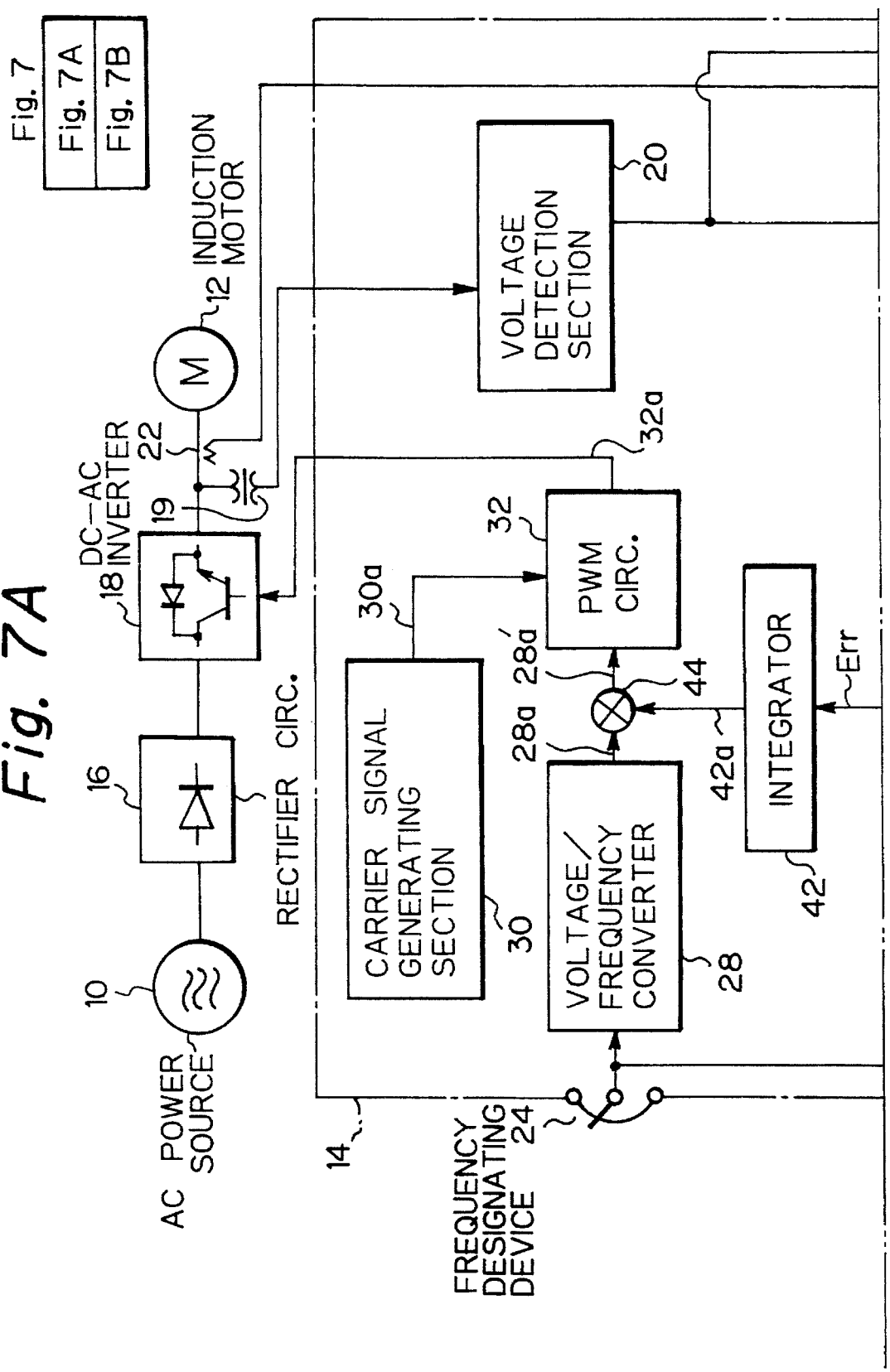

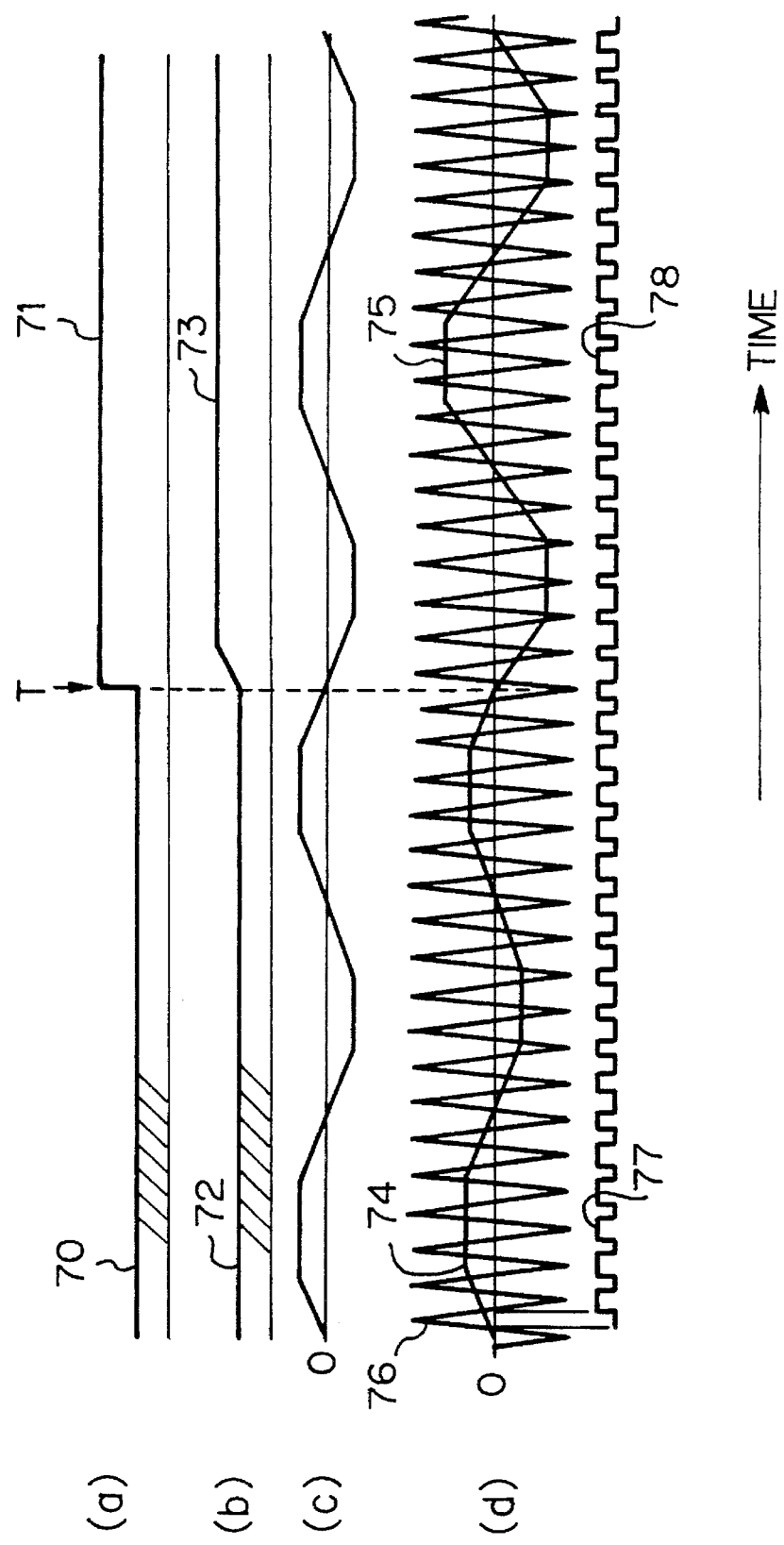

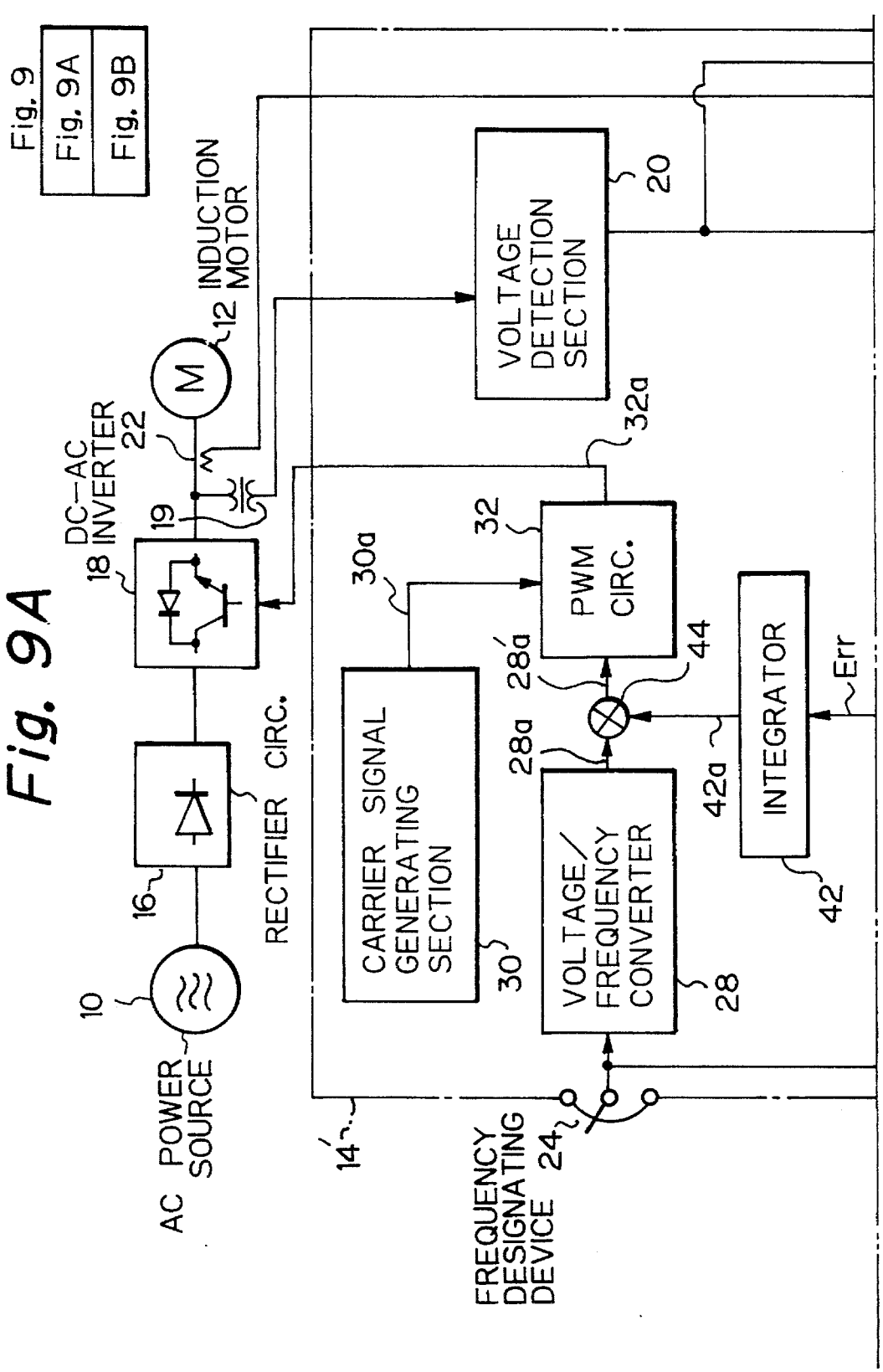

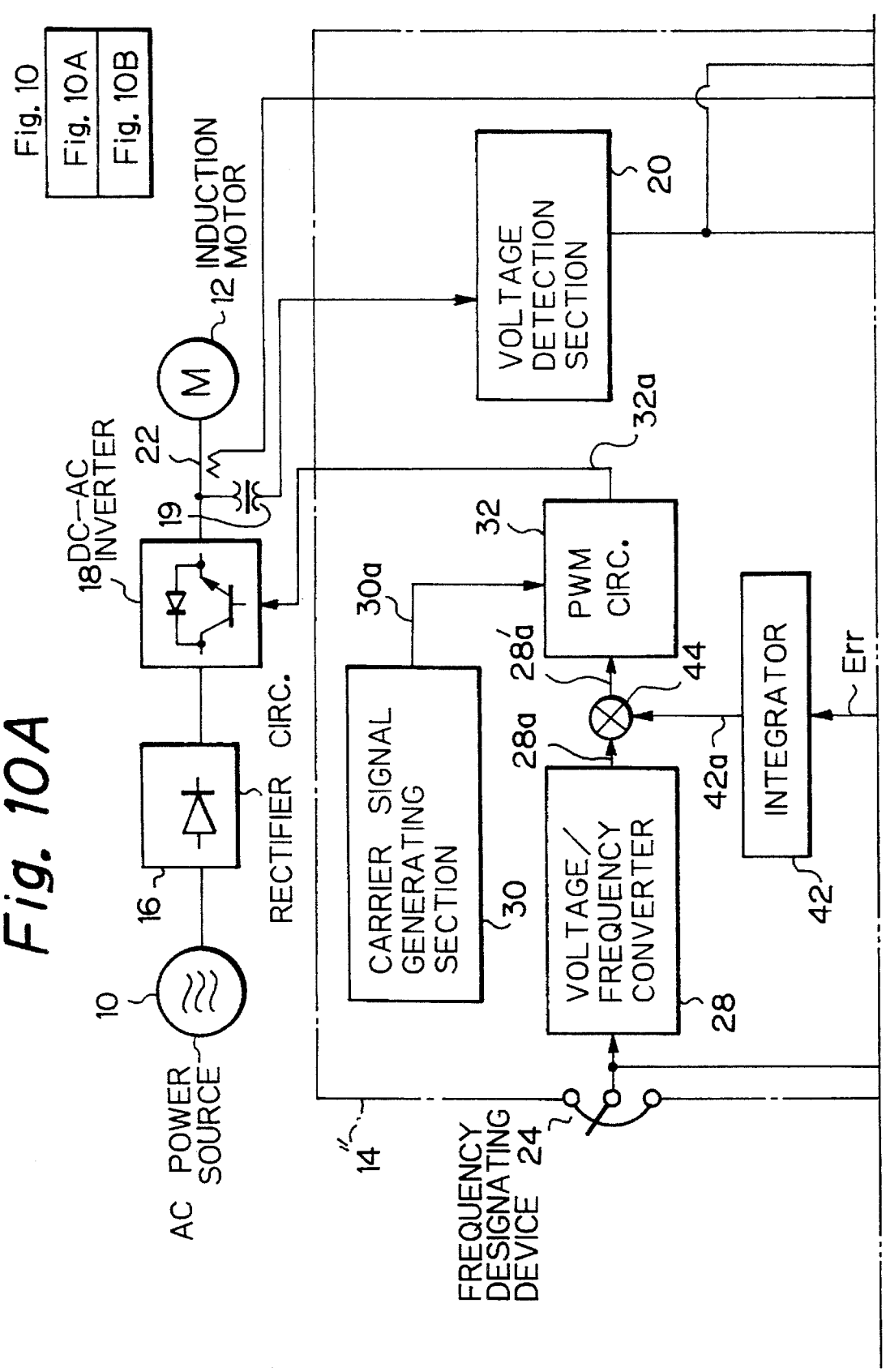

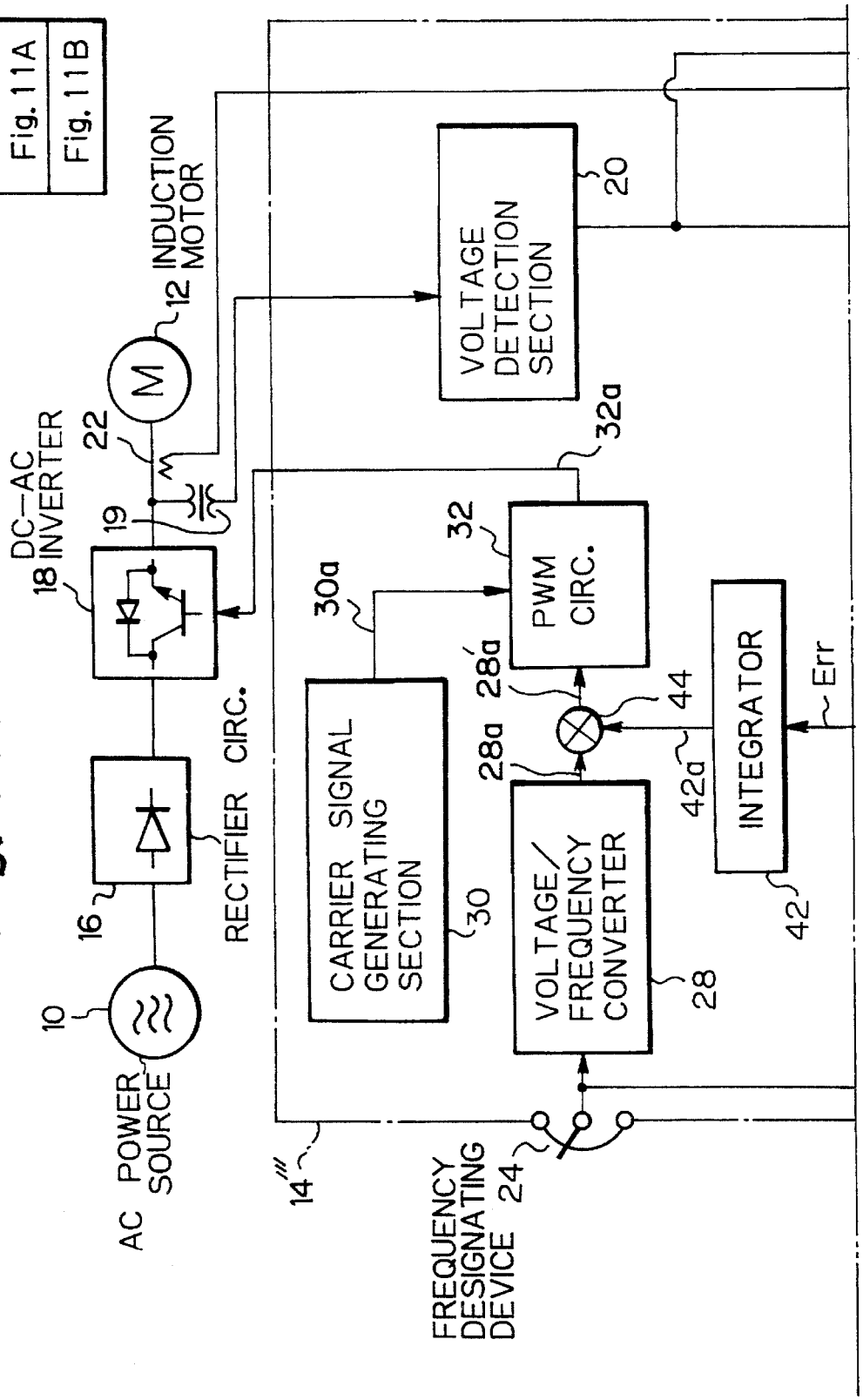

5,500,581

HIGH-EFFICIENCY POWER SUPPLY CONTROL APPARATUS FOR VARIABLE-SPEED INDUCTION MOTOR

BACKGROUND OF THE INVENTION

The present invention relates to an induction motor power supply control apparatus, and in particular to an induction motor power supply control apparatus providing variable-speed operation of an induction motor, together with a high degree of efficiency and with complete stability of operation over a wide range of motor load.

In the prior art, various proposals have been made for controlling the power supplied to an induction motor which must drive varying levels of load, in general by controlling the operation of a DC-AC power inverter (hereinafter referred to simply as a power inverter) to determine the supply voltage of the motor. Among these are proposals to obtain increased efficiency of operation of an induction motor by controlling the supply voltage such that the motor operates with a fixed value of power factor (typically, approximately 80%), irrespective of changes in the load imposed on the motor. However in practice it is found with such a method that although the operation is satisfactory when the motor is driving a high level of load, the power factor is excessively high when the motor is operating at an intermediate level of load or light load. That is to say, with such a method the value of supply voltage applied to the motor under a condition of intermediate load or light load is made excessively low, which can resulting an an excessive degree of motor slip, an excessive level of motor current, and hence increased power consumption when operating at an intermediate level of load. The objective of achieving increased efficiency is thereby defeated, while in addition the motor speed will become unstable when the motor is operating under light load or zero load, and the motor may stall.

Such problems of the prior art become especially severe in the case of a variable-speed induction motor which must not only function with efficiency and stability over a wide range of load values, but also at a number of different values of supply frequency. An induction motor control apparatus for controlling a variable-speed induction motor is described for example in Japanese Patent Laid-open Publication No. 64-50792 whereby respectively different values of optimum power factor are established for various values of motor supply frequency. The supply voltage of the induction motor is controlled to operate, at any particular value of drive frequency, fixedly at the power factor that has been predetermined for that frequency. However for the reasons described above, such a method cannot provide high efficiency and stability of operation for a motor which must drive a wide range of varying load values.

SUMMARY OF THE INVENTION

It is an objective of the present invention to overcome the problem is of the prior art set out above, by providing an induction motor power supply control apparatus whereby an induction motor can be driven for variable-speed operation over a wide range of varying levels of load, with a high degree of efficiency, and with complete stability and freedom from stalling.

The above objective is achieved by providing an induction motor power supply control apparatus for controlling the supply voltage of a variable-speed induction motor such that the degree of motor slip, at any particular value of motor load, is in accordance with a predetermined relationship between values of motor load and slip. That relationship, referred to in the following as the optimum slip characteristic, is predetermined such that the induction motor will always operate at a value of supply voltage which provides the maximum degree of efficiency that is consistent with stability, for the load at which the motor is currently operating. A value corresponding to the degree of motor slip is obtained by detecting the value of a motor operating parameter which varies in accordance with the motor slip value, for example the motor admittance, impedance, or the power factor at which the motor is currently operating, Each of these operating parameters can be detected by monitoring the supply voltage and current of the induction motor. The detected operating parameter value is then compared with an optimum value of that operating parameter, i.e. a value which the operating parameter would have if the motor slip were in accordance with the aforementioned optimum slip characteristic. Any error between the detected and optimum values of the operating parameter is then applied to control the power inverter such as to adjust the motor supply voltage to bring the detected value of the operating parameter towards the optimum value.

The relationship between such optimum operating parameter values and the coresponding values on the optimum slip characteristic will vary in accordance with the power supply frequency of the motor. The supply voltage applied to the induction motor varies in accordance with the motor load. With the present invention therefore, a plurality of functions relating operating parameter values and motor supply voltage are provided (i.e. stored in a memory device), with each function relating optimum values of the operating parameter to corresponding values of motor supply voltage, and with the various functions being applicable to respectively different predetermined values of motor supply frequency. Thus by selecting the appropriate one of these functions (referred to in the following as operating parameter functions) for the frequency at which the motor is currently operating, and obtaining an operating parameter value from that function in accordance with the value of supply voltage at which the motor is operating, the optimum operating parameter value for the load at which the motor is currently operating can be obtained. The motor supply voltage can then be varied such as to reduce any amount of difference between that optimum value and an actual detected value of the operating parameter.

More specifically, according to a first aspect, the present invention provides an induction motor power supply control apparatus for controlling the frequency and the amplitude of an AC voltage which is derived from an AC power source voltage and is supplied to an induction motor as a motor supply voltage, the apparatus comprising:

conversion means for converting the AC power source voltage to the motor supply voltage;

means for deriving a detected value of the motor supply voltage and a corresponding detected value of supply current of the induction motor;

load indication parameter detection means for deriving a detected value of a load indication parameter of the induction motor, the load indication parameter varying in accordance with a level of load imposed on the induction motor;

operating parameter detection means responsive to the detected values of motor supply voltage and supply current for deriving a detected value of an operating parameter, the operating parameter varying in accordance with a degree of slip at which the induction motor is driving the load;

supply frequency designating means operable for producing a frequency designating signal expressing a designated frequency value which is one of a predetermined set of frequency values, and for applying the frequency designating signal to the conversion means, the conversion means being responsive to the frequency designating signal for setting the frequency of the motor supply voltage at the designated frequency value;

optimum operating parameter derivation means responsive to the frequency designating signal for selecting one of a predetermined plurality of operating parameter functions, each of the functions relating optimum operating parameter values to values of the load indication parameter, the optimum operating parameter derivation means being responsive to the detected load indication parameter value for producing an optimum operating parameter value in accordance with the selected one of the operating parameter functions; and comparator means for deriving an error value expressing an amount of difference between the optimum operating parameter value produced from the optimum operating parameter derivation means and the detected operating parameter value, and for supplying the error value to the conversion means, the conversion means being responsive to the error value for varying the motor supply voltage amplitude such as to reduce the amount of difference;

each of the operating parameter functions being predetermined as corresponding to an optimum motor slip characteristic which expresses a predetermined relationship between values of the slip and corresponding values of the load.

The operating parameter can for example be the power factor at which the induction motor is operating, in which case the operating parameter detection means comprises means for operating on the detected values of motor supply voltage and supply current to obtain a detected value of power factor, and the operating parameter functions respectively relate optimum power factor values to values of the load indication parameter.

Alternatively, the operating parameter can be the amount of power that is being consumed by the motor, in which case the operating parameter detection means comprises means for operating on the detected values of motor supply voltage and supply current to obtain a detected value of power that is being consumed by the induction motor, and the operating parameter functions respectively relate optimum power values to values of the load indication parameter It is also possible for the operating parameter to be the impedance of the motor windings, in which case the operating parameter detection means comprises means for operating on the detected values of motor supply voltage and supply current to obtain a detected value of the impedance, and the operating parameter functions respectively relate optimum impedance values to values of the load indication parameter It is further possible to use the admittance of the motor windings as the operating parameter, in which case the operating parameter detection means comprises means for operating on the detected values of motor supply voltage and supply current to obtain a detected value of the admittance, and the operating parameter functions respectively relate optimum admittance values to values of the load indication parameter The conversion means of such an induction motor power supply control apparatus preferably comprises rectifier circuit means for converting the power source voltage to a DC voltage, DC-to-AC inverter means for converting the DC voltage to the motor supply voltage, and pulse width modulation control means coupled to receive the frequency designating signal and the error signal, for generating a pulse width modulation signal having a degree of modulation controlled in accordance with the error value and a frequency of modulation which is equal to the designated frequency value, with the pulse width modulation signal being supplied to the DC-to-AC inverter means, for controlling the amplitude and frequency of the motor supply frequency.

Furthermore, the detected value of motor supply voltage is preferably used as the aforementioned load indication parameter.

The optimum operating parameter derivation means preferably comprises:

means for generating a preset reference operating parameter value;

compensation function means for storing data representing a plurality of compensation functions predetermined as corresponding to respective ones of the aforementioned set of frequency values, each of the compensation functions relating predetermined compensation values to respective values of the load indication parameter;

selector means responsive to the frequency designating signal for selecting one of the compensation functions, the compensation function means being responsive to the detected load indication parameter value for producing a compensation value determined in accordance with the detected load indication parameter value and the selected one of the compensation functions; and means for multiplying together the compensation value and the reference operating parameter value, to obtain the aforementioned optimum operating parameter value that is produced by the optimum operating parameter derivation means.

BRIEF DESCRIPTION OF THE DRAWINGS

FIGS. 1A–1B is a conceptual block system diagram to illustrate the basic operation of an induction motor power supply control apparatus according to the present invention;

FIGS. 7A–7B is a block diagram of a first embodiment of an induction motor power supply control apparatus according to the present invention, in which the power factor at which an induction motor is operating is used as the operating parameter;

FIG. 8 is a waveform diagram for use in describing the operation of a pulse width modulation circuit in the embodiment of FIG. 7;

FIGS. 9A–9B is a block diagram of a second embodiment of an induction motor power supply control apparatus according to the present invention, in which the power which is being consumed by an induction motor is used as the operating parameter;

FIGS. 10A–10B is a block diagram of a third embodiment of an induction motor power supply control apparatus according to the present invention, in which the impedance of the windings of an induction motor is used as the operating parameter; and FIGS. 11A–11B is a block diagram of a fourth embodiment of an induction motor power supply control apparatus according to the present invention, in which the admittance of the windings of an induction motor is used as the operating parameter.

DESCRIPTION OF PREFERRED EMBODIMENTS

Figure 3:
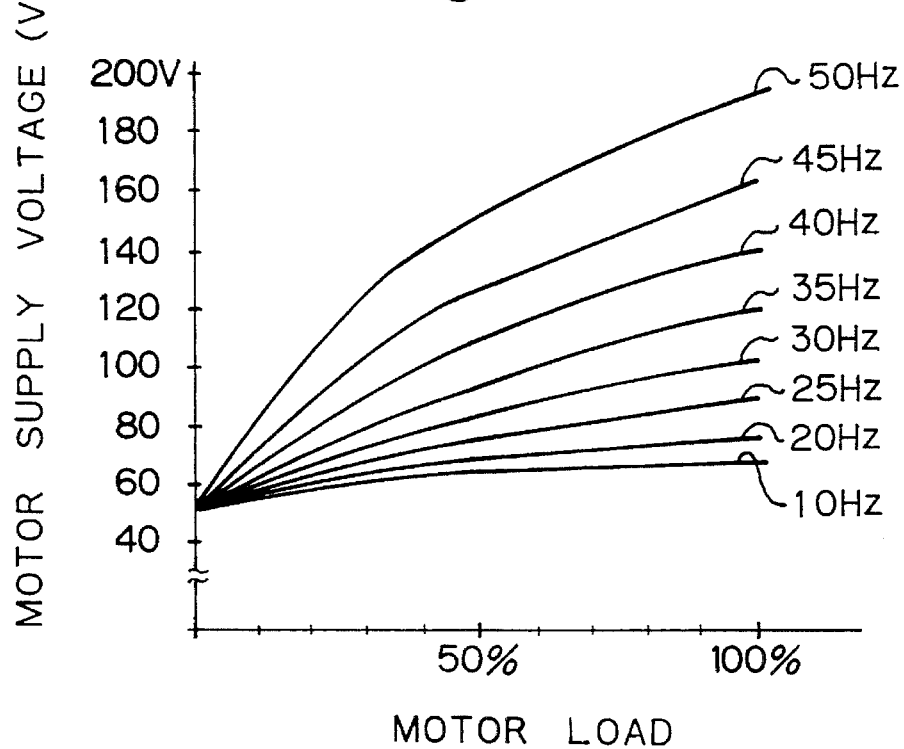
FIG. 3 shows functions, for respectively different values of induction motor supply frequency, which relate values of motor supply voltage to values of motor load.
Figure 4:
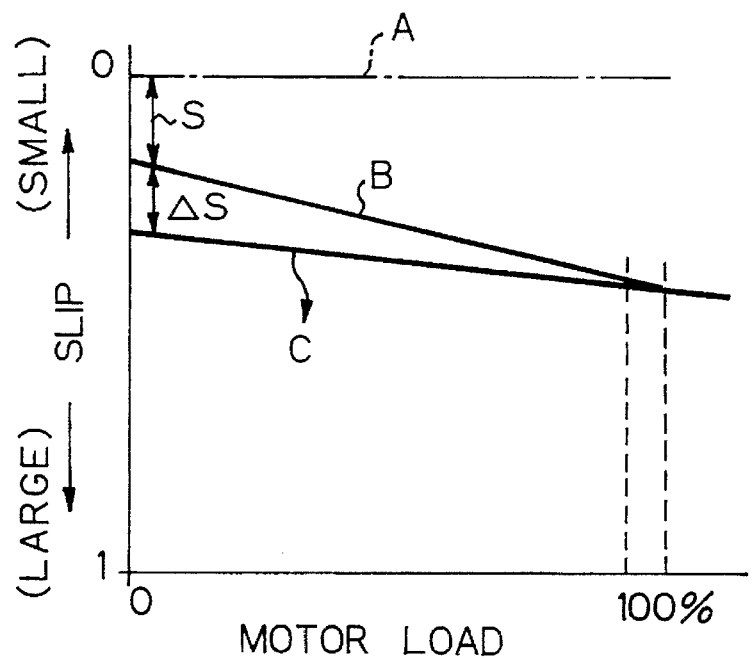
FIG. 4 shows an optimum slip characteristic for an induction motor, which relates optimum values of slip, whereby efficiency and stability are ensured, to corresponding levels of motor load.

Before describing preferred embodiments of the present invention, the basic concepts of the invention will be described, referring first to the conceptual block diagram of FIG. 1 and to the graphs of FIGS. 2, 3 and 4. In FIG. 4, values of slip of an induction motor are plotted along the vertical axis (from the condition of complete slip, indicated as 1, to zero slip, indicated as 0), and values of motor load along the horizontal axis (from zero load to approximately full load, indicated as 100%). If the slip were to be zero for all load values, the slip characteristic would be a horizontal line as-indicated by A. In the case of an induction motor which is powered by a fixed value of supply voltage the slip characteristic would be as indicated by curve B, and the amount of motor slip at any particular value of motor load is designated as S. However in the case of an induction motor whose supply voltage is controlled by an apparatus according to the present invention, the slip characteristic is of the form shown by curve C. In that case, the amount of motor slip, at each value of motor load, is greater than the corresponding slip value for the case of constant supply voltage operation, by an amount ΔS. That amount ΔS gradually increases, as shown, as the motor load is reduced from full load towards zero load. The values of slip which are expressed by curve C correspond to respective values of power factor of motor operation, at each load value, which have been predetermined as ensuring high efficiency throughout the load range together with complete stability of operation throughout that range, with no danger of stalling occurring when operating under low load or zero load.

In order to control the motor supply voltage such that the slip characteristic will be of the (S+ΔS) form shown by curve C in FIG. 4, it is necessary to take into consideration not only the motor load, but also the motor supply frequency. With an induction motor power supply control apparatus according to the present invention the motor supply voltage is varied in accordance with the motor load, at each of various specific values of supply frequency, as illustrated in the graphs of FIG. 3. If for example the motor supply frequency is set at 50 Hz, then the motor supply voltage will be varied with respect to motor load, from zero to full load, as indicated by the "50 Hz" curve. It can be seen that for each frequency, the supply voltage is increased in accordance with increases in motor load. Since for each supply frequency there is such a known relationship between values of motor supply voltage and motor load, the level of load at which the motor is currently operating can be detected based on the level of supply voltage at that time. Thus, for each value of motor supply voltage (at any specific value of motor supply frequency) there is a corresponding optimum value of slip, and hence there is a corresponding optimum value of an operating parameter which varies in accordance with the motor slip. It is thus possible to establish, for a plurality of different predetermined values of supply frequency which can be specified by the user, a corresponding plurality of functions each of which expresses the relationship between the optimum values of the operating parameter and the corresponding values of motor supply voltage, for operation at the specified frequency.

As stated above, one of the operating parameters which varies in accordance with slip is the power factor at which the induction motor is operating. FIG. 2 shows for the case in which the power factor is used as the operating parameter, respective characteristics for a plurality of different values of supply frequency, with each characteristic relating the optimum values of power factor (in the range 0 to 1) to the corresponding values of motor supply voltage (expressed as percentages of the maximum supply voltage). In the following, such a set of characteristics for respectively different values of supply frequency, with optimum power factor values expressed as a function of motor supply voltage, will be referred to as the operating parameter functions.

The basic operation of an induction motor power supply control apparatus according to the present invention will be described referring to the conceptual block diagram of FIG. 1, in which an AC power source 10 supplies an AC source voltage (or 3-phase AC source voltages) to a rectifier circuit 16, to be converted to a DC voltage. The DC voltage is supplied to a DC-to-AC inverter 18, which is controlled by a PCM (pulse code modulation) signal from a PCM control section 1 to convert the DC voltage to an AC motor supply voltage having a frequency and amplitude which are determined by the PCM signal. That motor supply voltage is supplied to an induction motor 12, and the level of that motor supply voltage and the motor supply current are detected, for example using a current transformer 22 and voltage transformer 19 as shown. An operating parameter detection section 2 operates on these values of voltage and current to obtain the corresponding value of a specific operating parameter of the induction motor 12. That detected value of the operating parameter is supplied to one input of a comparator 40. An optimum operating parameter value derivation section 3 has stored therein (e.g. in a read-only memory) data representing a set of operating parameter functions 4 as described above. A frequency designating value (produced from a frequency designation section 8, and specifying the motor supply frequency) is applied to the PCM control section 1, causing the PCM control section 1 to modulate the PCM signal at the specified frequency value, and is also supplied to the optimum operating parameter value derivation section 3, to select the corresponding one of the operating parameter functions. The detected value of the motor supply voltage is utilized as a load indication parameter, i.e. indicating the level of load which the motor 12 is currently driving, and that detected motor supply voltage value is also applied to the optimum operating parameter value derivation section 3, to obtain from the selected one of the operating parameter functions the optimum operating parameter value that corresponds to the load at which the induction motor 12 is currently operating. That optimum operating parameter value is supplied to the other input of the comparator 40. An error value is thereby obtained from the comparator 40, which will normally be close to zero. If there is a change in the motor load to a new load level, then a corresponding change in the motor current, and hence in the detected operating parameter value, will occur. Thus a condition will momentarily occur in which the detected operating parameter value differs from the optimum operating parameter value that is being produced from the optimum operating parameter value derivation section 3, and the resultant amount of difference between the detected value of the operating parameter and the optimum value of the operating parameter, i.e. error value from the comparator 40, is supplied to the PCM control section 1, which responds by producing a change in the motor supply voltage in a direction tending to reduce the amount of error. This feedback control operation continues until a value of the motor supply voltage is reached at which the optimum operating parameter value corresponding to that motor supply voltage value is identical to the detected value of the operating parameter. This signifies that, after the change in motor load has occurred, the induction motor is again operating with a value of slip that is correctly located (with respect to the new value of load) on the (S+ΔS) slip characteristic C shown in FIG. 4.

Figure 2:
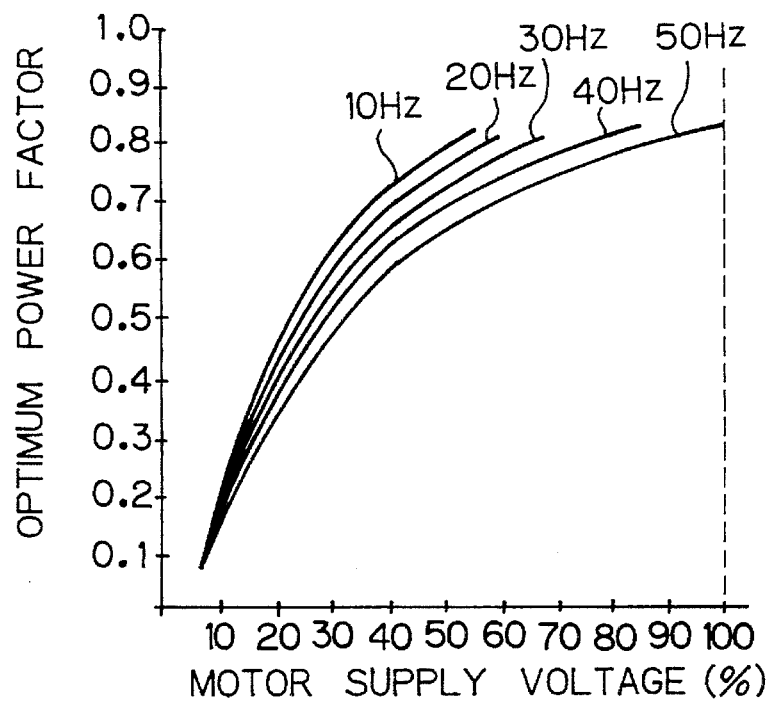
FIG. 2 shows functions, for respectively different values of induction motor supply frequency, which relate optimum values of an operating parameter of the motor to values of motor supply voltage.
Figure 5:
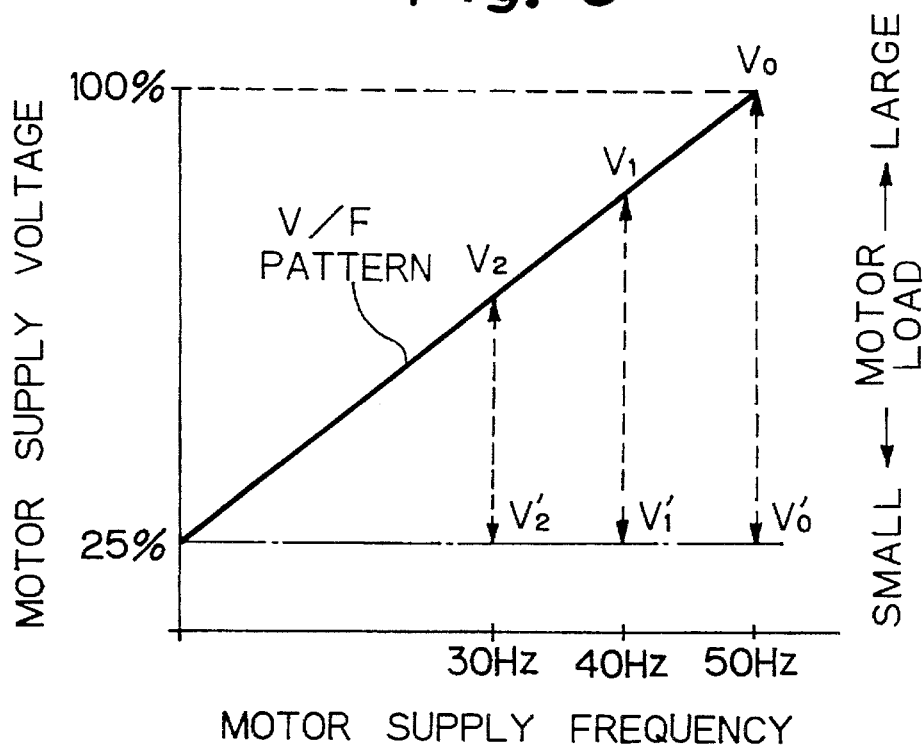
FIG. 5 shows an example of a voltage/frequency pattern for a variable-speed induction motor, which relates full-load motor supply voltage values to respective values of motor supply frequency.

As can be understood from the function characteristics of FIG. 2, an induction motor power supply control apparatus according to the present invention controls the motor supply voltage to vary between specific upper and lower limit values, which are determined by the power factors at which the motor is to operate at maximum and minimum load values respectively, and by the motor supply voltage. With the function characteristics shown in FIG. 2, for example, the supply voltage is controlled (irrespective of the motor supply frequency) such that the optimum power factor will be approximately 0.8 when the motor is operating under maximum load (i.e. full load), and approximately 0.1 when the motor is operating under a light (or zero) load. These relationships between the motor supply frequency values and the motor supply voltage range at each frequency are illustrated in FIG. 5. In FIG. 5 it is assumed that, when the motor supply frequency is set as 50 Hz, the motor supply voltage will be set to its maximum value V0 when operating under full load, and will be set to a low value designated as V0' when operating at 25% of full load. The corresponding values for operation at a supply frequency of 40 Hz are V1 and V1', where V1 is smaller than V0, and for operation at a supply frequency of 30 Hz are V2 and V2' where V2 is smaller than V1. Such a characteristic which relates values (V0, V1, V2) of the full-load motor supply voltage values at different values of motor supply frequency, is generally referred to as the V/F pattern of an induction motor.

It can be understood from the above that an induction motor power supply control apparatus according to the present invention basically consists of:

a converter section (formed in FIG. 1 of a combination of the rectifier circuit 16, the DC-to-AC inverter 18, and the PCM control section 1) which converts the AC power source voltage to the motor supply frequency, the operating parameter detection section 2 which operates on detected values of the motor supply voltage and the corresponding level of motor supply current (i.e. the current which flows in the motor in response to the motor supply voltage) to obtain a detected value of the operating parameter, the supply frequency designating section 8 which specifies one out of a predetermined set of motor supply frequency values, the optimum operating parameter value derivation section 3 which generates an optimum operating parameter value in accordance with the detected value of the motor supply voltage (since the motor supply voltage value is used as a parameter indicating the level of load which is currently imposed on the induction motor 12), and the comparator 40 which obtains the difference between the detected value of the operating parameter and the optimum operating parameter value, with that difference (i.e. error amount) being applied to the converter section to control the amplitude of the motor supply voltage such as to reduce the amount of the difference. The motor supply voltage amplitude is thereby changed (e.g. in an increasing direction, if the motor load has increased) such as to bring the motor supply voltage amplitude to a new value at which the detected value of the operating parameter will be close to a (new) optimum operating parameter value that corresponds to the new amplitude of motor supply voltage.

Figure 6:
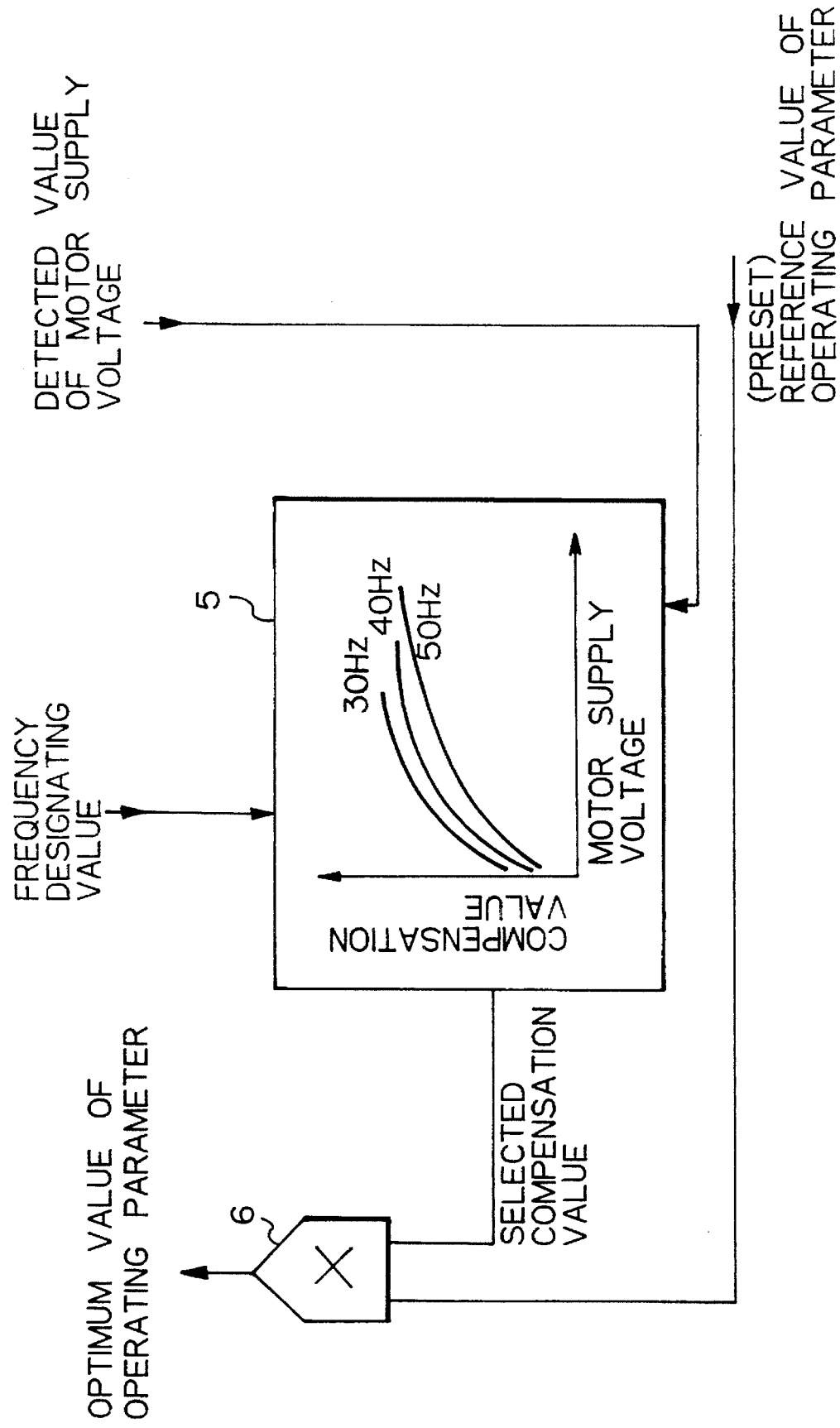
FIG. 6 is a conceptual diagram to illustrate the manner in which an optimum operating parameter value is derived, in embodiments of the present invention, by multiplying a compensation value by a preset reference operating parameter value.

Although the conceptual block diagram of FIG. 1 has been described in the above assuming that data representing a fixed set of function characteristics are held in the optimum operating parameter value derivation section 3, in a practical induction motor power supply control apparatus it is necessary to be able to adjust the function characteristics, to provide control that can be matched to various different induction motors. For that reason, in an induction motor power supply control apparatus according to the present invention, optimum operating parameter values are preferably generated by using a presettable reference value of operating parameter, and by applying compensation to that reference value in accordance with the detected motor supply voltage, using compensation functions which are of the form shown in FIG. 2, but with each of these expressing values of compensation factor as a function of detected motor supply voltage amplitude. That arrangement can be understood from the conceptual diagram of FIG. 6, illustrating the actual operation of the optimum operating parameter value derivation section 3 of FIG. 1. A compensation function section 5, which can be for example based on a memory device such as a ROM, has stored therein data representing a set of functions, referred to in the following as the operating parameter compensation functions, which are of similar form to the operating parameter functions of FIG. 2, i.e. which correspond to respectively different values of motor supply frequency. One of these compensation functions is selected in accordance with the aforementioned frequency designating value. An operating parameter compensation value is then obtained from the selected function, in accordance with the detected value of motor supply voltage. That compensation value and a reference operating parameter value are then multiplied together in a multiplier 6, to obtain the optimum operating parameter value which corresponds to the detected value of motor supply voltage and to the designated motor supply frequency value.

Figure 7B:
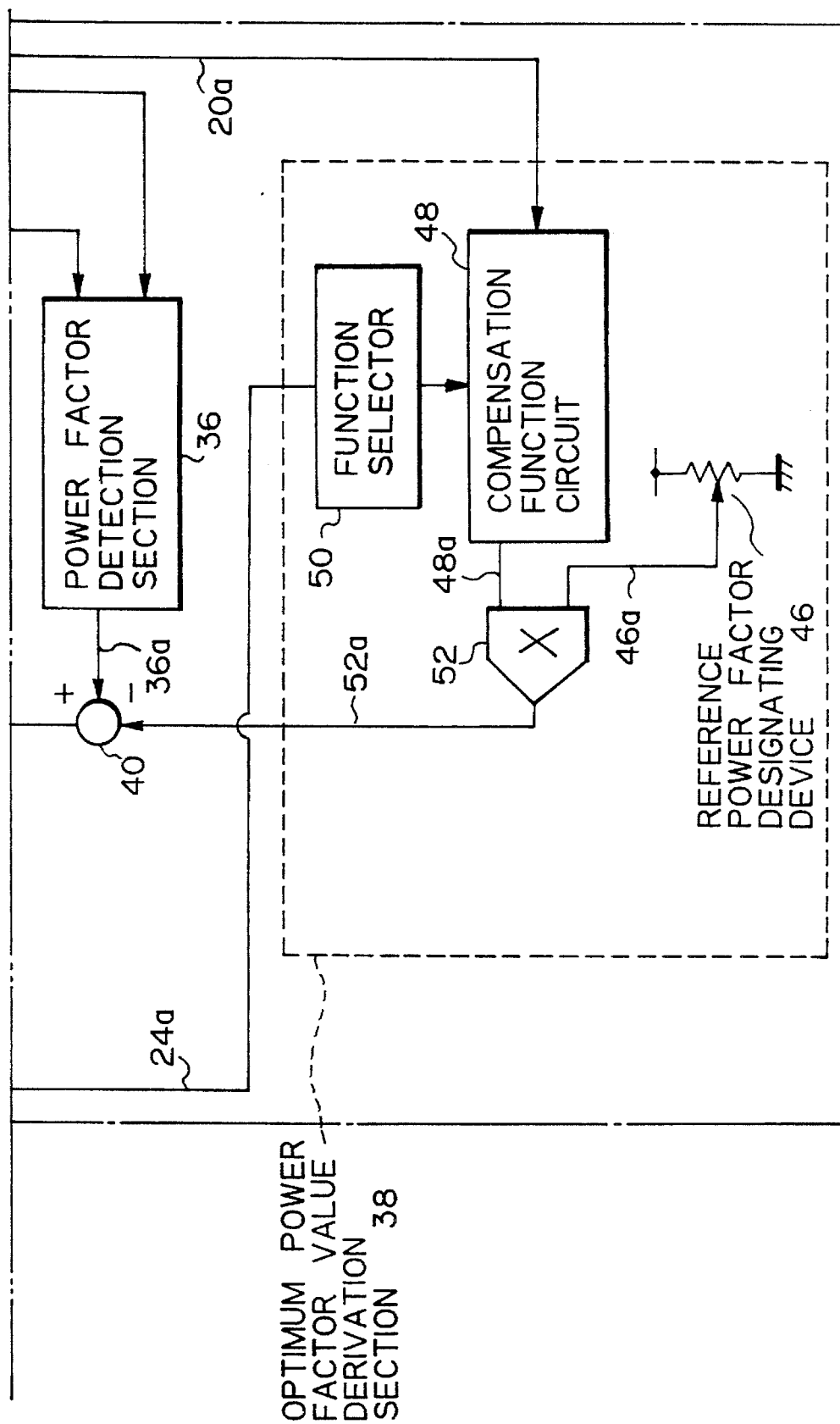

A first embodiment of the invention will be described referring to FIG. 7. In this embodiment, the power factor at which the 12 operates is used as the aforementioned operating parameter. The contents of FIG. 7 are related to the conceptual block diagram of FIG. 1 as follows. A optimum power factor value derivation section 38 corresponds to the optimum operating parameter value derivation section 3 of FIG. 1, i.e. having stored therein a set of power factor compensation functions for respectively different values of motor supply frequency, one of which is selected by a selection signal from a function selector section 50, in accordance with the currently designated value of supply frequency. A reference power factor value is preset by means of a reference power factor designating device 46. The combination of a voltage detection section 20 and power factor detection section 36 corresponds to the operating parameter detection section 2 of FIG. 1. A frequency designating signal value 24a produced from a frequency designating device 24 corresponds to the supply frequency designating value of FIG. 1. A combination of a carrier signal generating section 30, a voltage-to-frequency converter section 28, a multiplier 44, a integrator 42, and a PWM circuit 32 correspond to the PCM control section 1 of FIG. 1. A power factor detection section 36 corresponds to the operating parameter detection section 2 of FIG. 1.

The frequency designating device 24 can be preset by the user to generate a frequency designating signal which specifies one of a plurality of predetermined values of supply frequency for the induction motor 12, to obtain variable-speed operation of the induction motor 12. The frequency designating value 24a produced from the frequency designating device 24 is supplied to the voltage-to-frequency converter section 28, which produces an alternating voltage signal 28a, at the designated frequency. That signal 28a is supplied to one input of the multiplier 44. The output signal from the voltage transformer 19 is supplied to a voltage detection section 20, to be converted to a detected supply voltage value 20a, which is in suitable signal form for use by the power factor detection section 36 and a compensation function circuit 48. The power factor detection section 36 derives, from that detected supply voltage value 20a and the value of motor supply current that is expressed by the detection signal produced from the current transformer 22, the value of power factor at which the induction motor 12 is currently operating, and outputs a signal value 36a representing that power factor. That power factor value 36a is supplied to one input of the comparator 40.

The detected supply voltage value 20a is supplied to the compensation function circuit 48, within the optimum power factor value derivation section 38. The compensation function circuit 48 corresponds to the compensation function section 5 of FIG. 6, i.e. has stored therein data representing a set of power factor compensation functions, for respectively different values of supply frequency. The detected supply voltage value 20a is applied to the compensation function circuit 48, to thereby obtain a corresponding power factor compensation value, which is supplied to one input of a multiplier 52, while the reference power factor value 46a is supplied to the other input of the multiplier 52, to thereby obtain as output an optimum power factor value 52a.

The reference power factor value 46a is preset, using the reference power factor designating device 46, such that the supply voltage/optimum power factor value (input/output) relationships that are established by the optimum power factor value derivation section 38 express a set of operating parameter functions (of the form shown in FIG. 2) which are correctly matched to the operating characteristics of the induction motor 12. A function selector section 50 is responsive to the frequency designating value 24a for generating a selection signal, for selecting the one of the operating parameter compensation functions stored in the compensation function circuit 48 that corresponds to the currently designated value of motor supply frequency.

The optimum power factor value 52a that is thus obtained in accordance with the detected supply voltage value 20a is supplied to the other input of the comparator 40, to obtain an error signal designated as Err. That error signal is then transferred through an integrator, and the resultant integrated error value 42a is supplied to the other input of the multiplier 44. The amplitude of the alternating voltage signal 28a produced from the optimum power factor value derivation section 38 is thereby multiplied by the integrated error value 42a to obtain an alternating voltage signal which will be referred to as the modulation reference signal 28'a, which is supplied to the PWM circuit 32.

A carrier signal generating section 30 supplies a fixed-frequency carrier signal 30a to the PWM circuit 32, which is modulated in accordance with the modulation reference signal 28'a, to obtain a PWM (pulse width modulation) signal 32a which is modulated at the frequency of the alternating voltage signal 28a, with the depth of modulation being increased in accordance with increases in the integrated error signal 42a. The PWM signal 32a is applied to control the DC-to-AC inverter 18, to obtain a motor supply voltage whose frequency is as specified by the frequency designating value 24a, and whose amplitude is controlled in accordance with the value of the error signal produced from the comparator 40.

The operation of the PWM circuit 32 will be described referring to the waveform diagrams of FIG. 8. In FIG. 8, diagram (a) illustrates the waveform of the output signal from the comparator 40, diagram (b) shows the corresponding waveform of the output signal from the integrator 42, diagram (c) shows the waveform of the alternating voltage signal 28a which is produced from the voltage-to-frequency converter 28, and diagram (c) shows the fixed-amplitude triangular wave signal 30a that is produced from the carrier signal generating section 30, and also the waveform of the modulation reference signal 28'a produced from the multiplier 44, and the resultant PWM signal that is produced from the PWM circuit 32.

In FIG. 8 it is assumed that there is a stepwise change in the motor load, at a time point indicated as T. That change results in an increase in the amount (Err) of difference between the optimum and the detected values of the power factor of the motor 12. Thus the error signal changes from the value indicated by numeral 70 to that indicated by numeral 71, after time point T. The integrated error signal correspondingly changes as indicated by numerals 72 and 73. As a result, the amplitude of the modulation reference signal 28'a increases after time point T, from the level indicated by numeral 74 to that indicated by numeral 75. Within the PWM circuit 32, the PWM signal 32a is derived such as to be at a high (H) level during each interval when the modulation reference signal 28'a is higher (i.e. more positive) than the carrier signal 30a, and to be at a low (L) level during each interval when the modulation reference signal 28'a is lower (i.e. more negative) than the carrier signal 30a. As a result, the depth of modulation of the PWM signal 32a is increased following the time point T, i.e. the pulse width of the PCM signal 32a during each positive half-cycle of that signal is increased (as indicated by numeral 78) following time point T by comparison with the pulse width (indicated by numeral 77) prior to time point T. It can thus be understood that the PCM signal 32a is modulated at a frequency which is identical to that of the alternating voltage signal 28a, with a degree of modulation that is controlled by the amount of difference between the optimum value of power factor and the detected value of power factor. The DC-to-AC inverter is configured such as to vary the amplitude of the motor supply voltage in proportion to the degree of modulation of the PCM signal 32a, so that the motor supply voltage amplitude is controlled based on the amount of difference between the optimum and detected values of power factor.

Figure 9B:
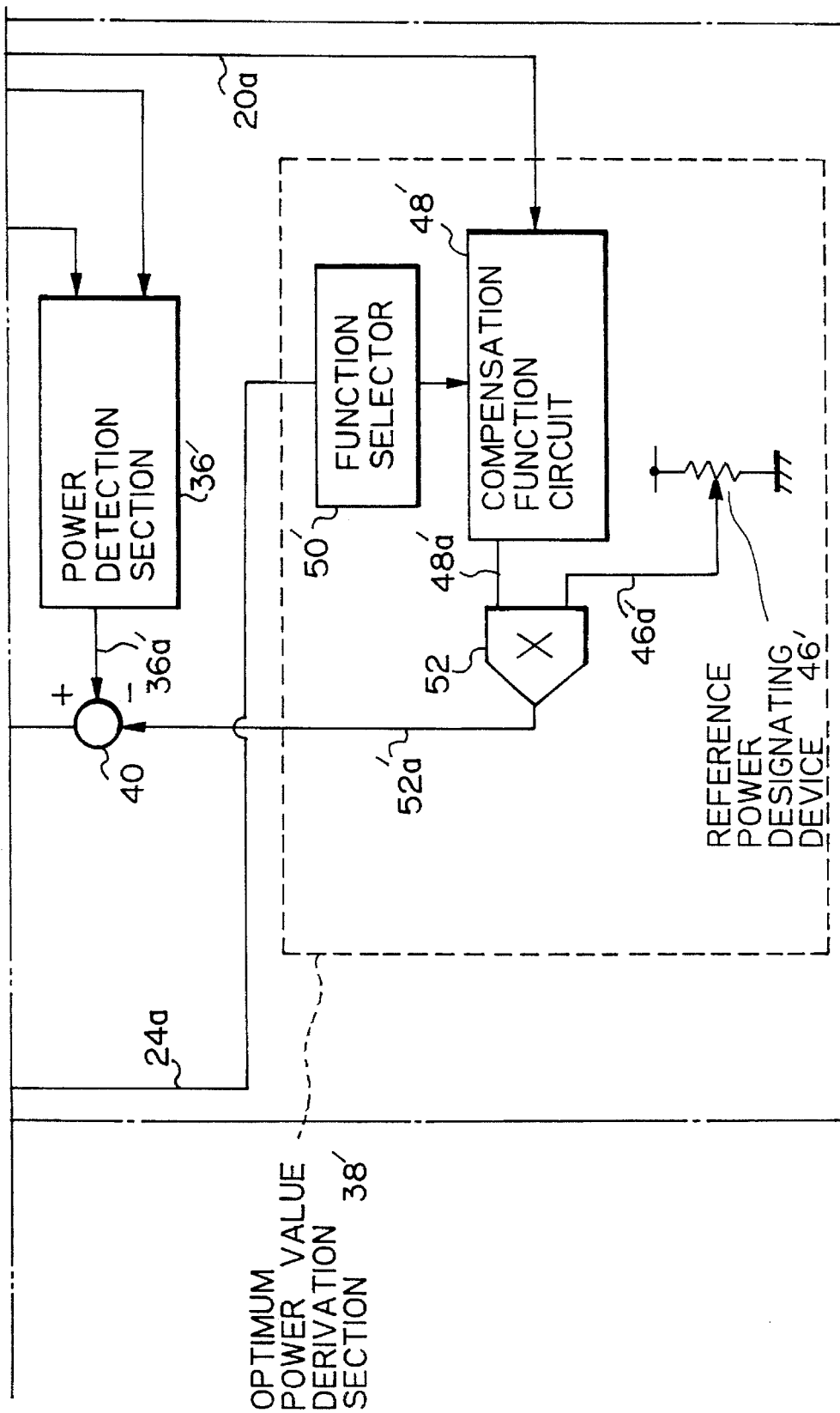

A second embodiment of the invention will be described referring to FIG. 9. This embodiment differs from the first embodiment in that the power being consumed by the induction motor is detected, as the operating parameter. The power is detected by a power detection section 36', and a detected power signal value 36a' is supplied to one input of the comparator 40. In an optimum power value derivation section 38' a compensation function circuit 48' has stored therein data expressing a plurality of power compensation functions, one of which is selected in accordance with the frequency that is specified by the frequency designating value 24a. A compensation value 48'a that is thereby obtained in accordance with the value 20a of supply voltage at which the induction motor 12 is currrently operating is supplied to the multiplier 52, to be multiplied by a reference power value 46a' which is produced by the reference power designating device 46'. An optimum power value 52a' is thereby produced from the multiplier 52, which is supplied to the other input of the comparator 40.

Each set of values constituting a compensation function stored in the compensation function circuit 48' if multiplied by the reference power value, forms an optimum power value function with respect to motor supply voltage. That is to say, each value of that function represents the power consumption value of the induction motor 12 (in relation to corresponding value of motor supply voltage) which is such that the motor is operating at the correct value of slip that is specified by the aforementioned (S+ΔS) slip characteristic. Thus by controlling the motor supply voltage of the induction motor 12 in accordance with the error value that is obtained from the comparator 40, in the same way as described for the first embodiment, the induction motor 12 is controlled to operate in accordance with the aforementioned predetermined (S+ΔS) slip characteristic, so that stable operation with high efficiency is achieved.

Figure 10B:
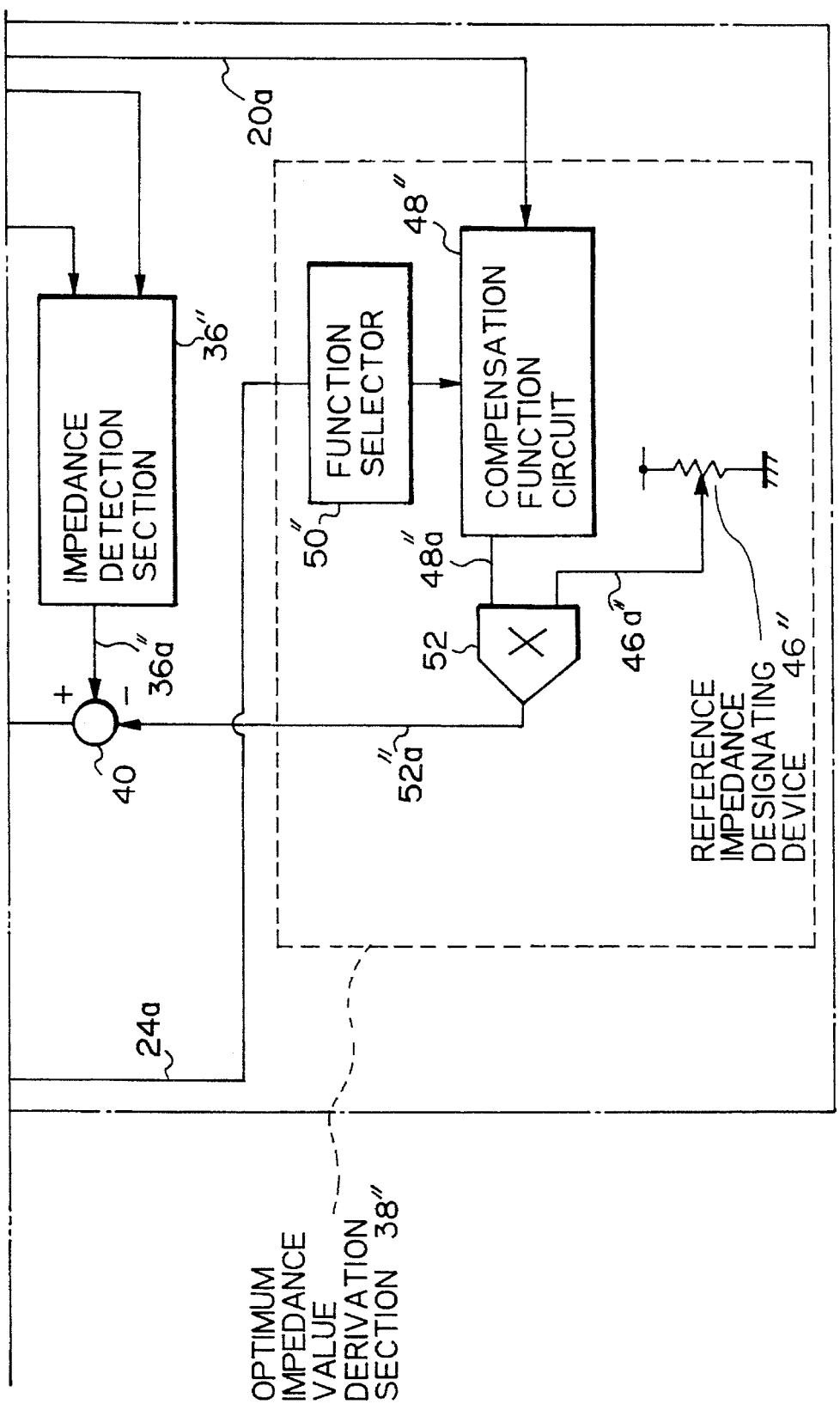

A third embodiment of an induction motor power supply control apparatus according to the present invention will be described referring to FIG. 10. This embodiment differs from the preceding embodiments in that the impedance of the motor windings is detected, and used as the operating parameter. The motor impedance is detected by an impedance detection section 36", based on the motor supply voltage and current values which are supplied thereto from the voltage detection section 20 and the current transformer 22, to obtain a detected impedance value 36a", which is applied to one input of the comparator 40. Optimum impedance values 52a" are derived by an optimum impedance value derivation section 38" in which a compensation function circuit 48" has stored therein data expressing a plurality of impedance compensation functions, one of which is selected in accordance with the frequency that is specified by the frequency designating value 24a. A compensation value 48a" that is thereby obtained in accordance with the value 24a of supply frequency at which the induction motor 12 is currrently operating is supplied to the multiplier 52, to be multiplied by a reference impedance value 46a" which is produced by the reference impedance designating device 46". An optimum impedance value 52a" is thereby produced from the multiplier 52, which is supplied to the other input of the comparator 40.

Each set of values constituting an impedance compensation function stored in the compensation function circuit 48" if multiplied by the reference impedance value 46" forms an optimum impedance function with respect to the motor supply voltage. That is to say, each value of that function represents the value of impedance of the induction motor 12 (in relation to a corresponding value of motor supply voltage) which is such that the motor is operating at the correct value of slip that is specified by the aforementioned (S+ΔS) slip characteristic. Thus by controlling the motor supply voltage of the induction motor 12 in accordance with the error value that is obtained from the comparator 40, in the same way as described for the first embodiment, the induction motor 12 is controlled to operate in accordance with the aforementioned predetermined (S+ΔS) slip characteristic, as for the preceding embodiments.

A fourth embodiment of an induction motor power supply control apparatus according to the present invention will be described referring to FIG. 11. This embodiment differs from the preceding embodiment in that the admittance of the motor windings is detected, and used as the operating parameter. The motor admittance is detected by an admittance detection section 36''', based on the motor supply voltage and current values which are supplied from the voltage detection section 20 and the current transformer 22 respectively, to thereby obtain a detected admittance value 36a''', which is applied to one input of the comparator 40. Optimum admittance values 52a''' are derived by an optimum admittance value derivation section 38''', in which a compensation function circuit 48''' has stored therein data expressing a plurality of admittance compensation functions, one of which is selected in accordance with the frequency that is specified by the frequency designating value 24a. A compensation value 48a''' that is thereby obtained in accordance with the value 24a of supply voltage at which the induction motor 12 is currrently operating is supplied to the multiplier 52, to be multiplied by a reference admittance value 46a''' which is produced by a reference admittance designating device 46'''. An optimum admittance value 52a''' is thereby produced from the multiplier 52, which is supplied to the other input of the comparator 40.

Each set of values constituting an admittance compensation function stored in the compensation function circuit 48''' if multiplied by the reference admittance value 46''', forms an optimum power value function with respect to the motor supply voltage. That is to say, each value of that function represents the value of admittance of the induction motor 12 (in relation to a corresponding value of motor supply voltage) which is such that the motor is operating at the correct value of slip that is specified by the aforementioned (S+ΔS) slip characteristic. Thus by controlling the motor supply voltage of the induction motor 12 in accordance with the error value that is obtained from the comparator 40, in the same way as described for the preceding embodiments, the induction motor 12 is controlled to operate in accordance with the aforementioned predetermined (S+ΔS) slip characteristic.

Figure 11B:
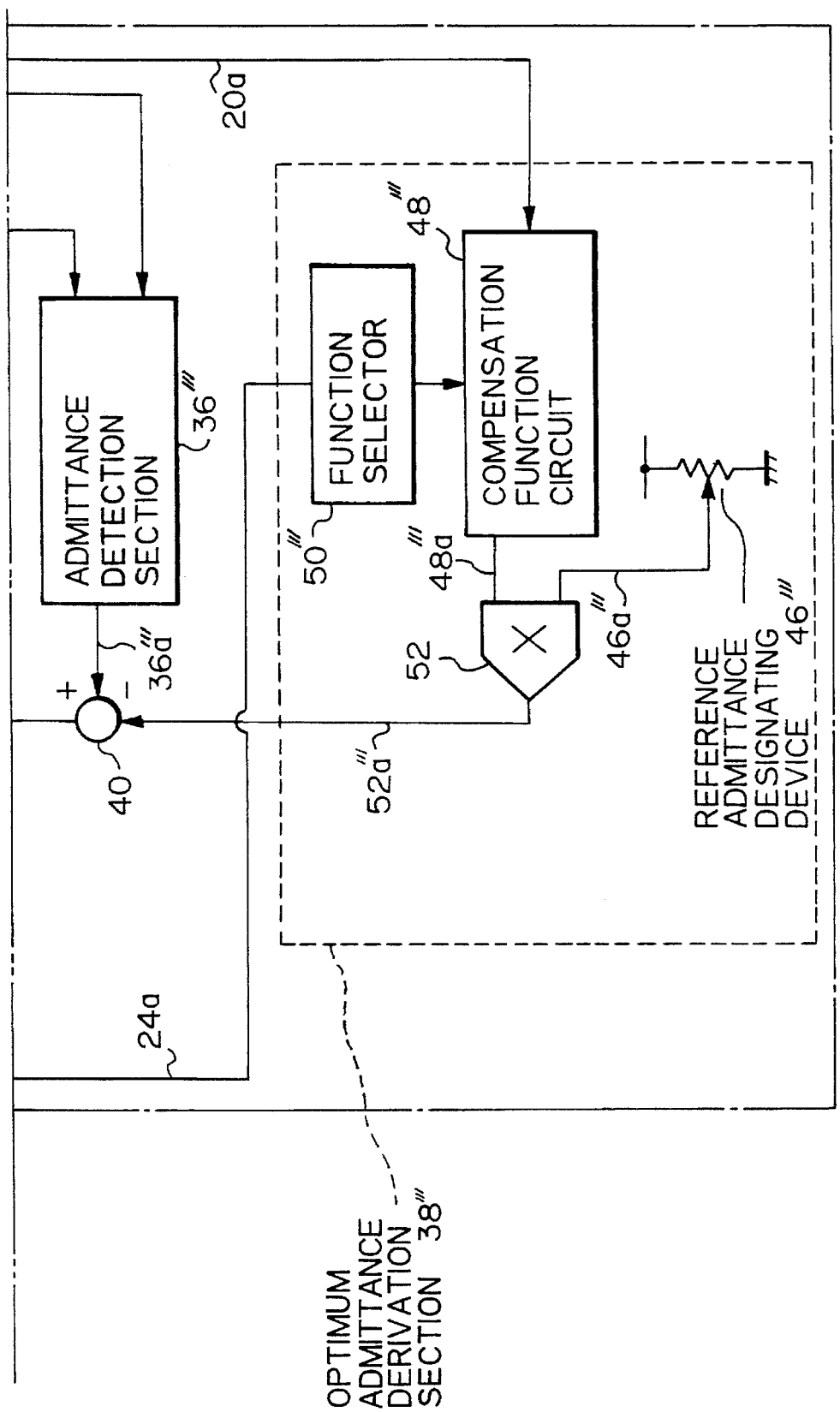

Since the direction of change of motor admittance, in response to a change in motor load, is opposite to the direction of change of the motor power factor, power, or impedance in response to a change in motor load, it is necessary to apply the optimum admittance value 52a''' and the detected admittance value 36a''' to respective inputs of the comparator 40 which are of opposite polarity to the corresponding connections to the comparator 40 of the preceding embodiments, as can be seen from FIG. 11.

As can be understood from the above description, an induction motor power supply control apparatus according to the present invention provides variable-speed operation of an induction motor whereby high efficiency is achieved over a wide range of motor load, together with complete stability and freedom from cogging or stalling even when the motor load is reduced to a low value. These advantages are achieved by controlling the motor supply voltage in accordance with the level of motor load, such that the degree of slip at any particular value of load will be in accordance with a predetermined characteristic which relates optimum values of slip to values of motor load.

Although the present invention has been described in the above referring to specific embodiments, it should be understood that various changes to these embodiments could be envisaged which would fall within the scope claimed for the invention.

What is claimed is:

1. An induction motor control apparatus for controlling a supply of power from an AC power source to an induction motor comprising:

a rectifier circuit for converting an AC voltage from said AC power source to a DC voltage;

DC-to-AC inverter means for converting said DC voltage to an AC supply voltage for driving said induction motor wherein said AC supply voltage has a level controlled by an inverter control signal;

frequency source means for generating a drive frequency signal having a drive frequency selectable from one of a plurality of drive frequencies for the induction motor;

a modulation means for generating said inverter control signal, said modulation means being responsive to said drive frequency signal to supply said AC supply voltage at said drive frequency and being responsive to a modulation control signal to control the level of said AC supply voltage; and means for generating said modulation control signal in accordance with a function of the level of said AC supply voltage supplied to the induction motor and said drive frequency, said function setting said modulation control signal to a level that varies the motor supply voltage along a plurality of curves for respectively different values of said drive frequency between lower and upper limit values in accordance with the motor load to operate the induction motor at a predetermined slip.

2. An induction motor control apparatus according to claim 1 wherein:

said frequency source means includes a settable voltage source and a voltage-to-frequency converter means responsive to said voltage source for generating said drive frequency signal at the drive frequency; and said modulation means includes a multiplier for multiplying together said drive frequency signal from the voltage-to-frequency converter means and said modulation control signal.

3. An induction motor control apparatus according to claim 1 wherein said means for generating said modulation control signal comprises:

first means for detecting a power factor as an indicator of a load on the induction motor;

second means for obtaining an optimum power factor value in accordance with a function of the supply voltage of the induction motor; and third means for comparing outputs of said first and second means and generating said modulation control signal in accordance with said comparison.

4. An induction motor control apparatus according to claim 1 wherein said means for generating a modulation control signal comprises:

a first means for detecting a power level indicative of a load on the induction motor;

a second means for obtaining an optimum power value compensated in accordance with a function of the supply voltage of the induction motor; and a third means for comparing outputs of said first and second means and generating said modulation control signal in correspondence with said comparison.

5. An induction motor control apparatus according to claim 1, in which said means for generating a modulation parameter comprises:

a first means for detecting an impedance indicative of a load on the induction motor;

a second means for obtaining an optimum impedance value compensated in accordance with a function of the supply voltage of the induction motor; and a third means for comparing outputs of said first and second means and generating said modulation control signal in correspondence with said comparison.

6. An induction motor control apparatus according to claim 1 wherein:

said modulation means includes a pulse width modulator generating said inverter control signal and responding to said drive frequency signal multiplied by said modulation control signal, and said level of said AC supply voltage has a level controlled by a level of pulse width modulation of said inverter control signal.

7. An induction motor control apparatus for controlling a supply of power from an AC power source to an induction motor comprising:

a rectifier circuit for converting an AC voltage from said AC power source to a DC voltage;

DC-to-AC inverter means for converting said DC voltage to an AC supply voltage for driving said induction motor wherein said AC supply voltage has a level controlled by an inverter control signal;

frequency source means for generating a drive frequency signal having a drive frequency selectable from one of a plurality of drive frequencies for the induction motor;

a modulation means for generating said inverter control signal, said modulation means being responsive to said drive frequency signal to supply said AC supply voltage at said drive frequency and being responsive to a modulation control signal to control the level of said AC supply voltage; and means for generating said modulation control signal in accordance with a function setting said modulation control signal to a level that varies the motor supply voltage along a plurality of curves for respectively different values of said drive frequency between lower and upper limit values in accordance with the motor load to operate the induction motor at a predetermined slip.

8. An induction motor control apparatus according to claim 7 wherein:

said frequency source means includes a settable voltage source and a voltage-to-frequency converter means responsive to said voltage source for generating said drive frequency signal at the drive frequency; and said modulation means includes a multiplier for multiplying together said drive frequency signal from the voltage-to-frequency converter means and said modulation control signal.

9. An induction motor control apparatus according to claim 7 wherein said means for generating said modulation control signal comprises:

first means for detecting an admittance as an indicator of a load on the induction motor;

second means for obtaining an optimum admittance value; and third means for comparing outputs of said first and second means and generating said modulation control signal in accordance with said comparison.

10. An induction motor control apparatus according to claim 7, in which said means for generating a modulation parameter comprises;

a first means for detecting an admittance as a load of the induction motor;

a second means for obtaining an optimum admittance value; and a third means for comparing outputs of said first and second means to obtain an error signal and generating said modulation parameter in correspondence with said error signal.

11. An induction motor control apparatus according to claim 10 wherein said first means detects said admittance by sensing a voltage and current level applied to said induction motor by said AC voltage supply.

12. An induction motor control apparatus according to claim 7 wherein:

said modulation means includes a pulse width modulator generating said inverter control signal and responding to said drive frequency signal multiplied by said modulation control signal, and said level of said AC supply voltage has a level controlled by a level of pulse width modulation of said inverter control signal.

13. An induction motor control apparatus for controlling a supply of power from an AC power source (10) to an induction motor (12), comprising:

a rectifier circuit (16) for converting an AC voltage supplied from said AC power source (10) to a DC voltage;

a DC-to-AC inverter means (18), controlled by a pulse width modulation (PWM) signal, for converting said DC voltage to an AC supply voltage to be supplied to said induction motor;

a frequency designating device (24) operable for generating a frequency designating signal (24a) which specifies one of a plurality of supply frequencies for the AC supply voltage applied to the induction motor;

a pulse width modulation circuit means (32), responsive to said frequency designating signal, for generating the PWM signal applied to said DC-to AC inverter means; and means for generating a modulation parameter (42a) having a value for varying the level of the AC supply voltage along a plurality of curves for respectively different values of induction motor supply frequency between lower and upper limit values in accordance with the motor load to operate the induction motor with a predetermined slip (s +Δs); and means (44) responsive to said modulation parameter (42a) for generating a modulation reference signal (28'a), which controls said pulse width modulation circuit means (32)to modulate a pulse width of said PWM signal.

14. An induction motor control apparatus according to claim 13, wherein said pulse width modulation circuit means includes:

a voltage-to-frequency converter means (28) responsive to said frequency designating signal for generating a reference voltage signal (28a) at the designated frequency; and a multiplier for multiplying together said reference voltage signal (28a) from the voltage-to-frequency converter means (28) and said modulation parameter (42a).

15. An induction motor control apparatus according to claim 13, in which said means for generating a modulation parameter (42a) comprises:

first means (36) for detecting a power factor indicative of a load on the induction motor;

second means (38) for obtaining an optimum power factor value (52a) compensated in accordance with a function indicative of the supply voltage of the induction motor; and third means (40, 42) for comparing outputs of said first and second means to obtain an error signal (Err) and generating said modulation parameter (42a) in correspondence with said error signal (Err).

16. An induction motor control apparatus according to claim 13, in which said means for generating a modulation parameter (42a) comprises:

first means (36') for detecting a power as an indicator of a load on the induction motor;

second means (38') for obtaining an optimum power value (52'a) compensated in accordance with a function indicative of the supply voltage of the induction motor; and third means (40, 42) for comparing outputs of said first and second means to obtain an error signal (Err) and generating said modulation parameter (42a) in correspondence with said error signal (Err).

17. An induction motor control apparatus according to claim 13, in which said means for generating a modulations parameter (42a) comprises:

first means (36") for detecting an impedance as an indicator of a load on the induction motor;

second means (38") for obtaining an optimum impedance value (52"a) compensated in accordance with a function indicative of the supply voltage of the induction motor; and third means (40, 42) for comparing outputs of said first and second means to obtain an error signal (Err) and generating said modulation parameter (42a) in correspondence with said error signal (Err).

18. An induction motor control apparatus according to claim 13, in which said means for generating a modulation parameter (42a) comprises:

first means (36'") for detecting an admittance as an indicator of a load on the induction motor;

second means (38'") for obtaining an optimum admittance value (52'"a); and third means (40, 42) for comparing outputs of said first and second means to obtain an error signal (Err) and generating said modulation parameter (42a) in correspondence with said error signal (Err).

* * * * *